United States Patent
Dunn et al.

(10) Patent No.: US 8,036,716 B2
(45) Date of Patent: Oct. 11, 2011

(54) TEMPORARY STORAGE OR SPECIALIZED TRANSMISSION OF MULTI-MICROPHONE SIGNALS

(75) Inventors: Gregory J. Dunn, Arlington Heights, IL (US); Terance B. Blake, Palatine, IL (US); Holly L. Francois, Guildford (GB); Peter A. Lin, Lisle, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 912 days.

(21) Appl. No.: 12/025,182

(22) Filed: Feb. 4, 2008

(65) Prior Publication Data

US 2009/0197564 A1 Aug. 6, 2009

(51) Int. Cl.
*H04Q 1/00* (2006.01)

(52) U.S. Cl. .................. 455/570; 455/569.1; 455/404.1; 381/94.1; 381/94.7

(58) Field of Classification Search .................. 455/403, 455/414.1, 404.1, 63.1, 65, 570, 73, 550.1, 455/569.1, 223, 355; 381/92, 93, 94.1, 94.7, 381/95
See application file for complete search history.

(56) References Cited

U.S. PATENT DOCUMENTS

| | | | |
|---|---|---|---|
| 6,978,010 B1 | 12/2005 | Short | |
| 7,450,691 B2 * | 11/2008 | Short et al. | 379/388.03 |
| 7,742,790 B2 * | 6/2010 | Konchitsky et al. | 455/570 |
| 2007/0111754 A1 | 5/2007 | Marshall | |
| 2007/0206505 A1 * | 9/2007 | Forbes | 370/252 |

FOREIGN PATENT DOCUMENTS

| | | |
|---|---|---|
| GB | 2401752 A | 11/2004 |
| WO | WO0171687 A | 9/2001 |
| WO | WO2008145134 A | 12/2008 |

* cited by examiner

*Primary Examiner* — Jean Gelin
(74) *Attorney, Agent, or Firm* — Anthony P. Curtis; Daniel R. Bestor

(57) ABSTRACT

A communication device contains multiple microphones that receive acoustic signals from a user and from the background. The acoustic signals from the user are enhanced using the background acoustic signals to reduce background noise. The enhanced signal are transmitted to an emergency network when an emergency call is made from the communication device. The raw signals are stored in the communication device for later retrieval or are transmitted simultaneously with the enhanced signals. The enhanced signals are transmitted using a circuit-switched voice mode while the raw signals are transmitted using a packet-switched voice mode.

20 Claims, 6 Drawing Sheets

TEMPORARY STORAGE OR SPECIALIZED TRANSMISSION OF MULTI-MICROPHONE SIGNALS

TECHNICAL FIELD

The present application relates to communication devices having multiple microphones. In particular, the application relates to a device, system, and method of storage and specialized transmission of multi-microphone signals from the device.

BACKGROUND

Increasingly, audio records of crimes and military events such as friendly fire deaths are used in forensic analysis. Emergency (911) calls from the victim's or eyewitness's cell phone, police radio transmissions, or military radio communications provide a record of the event that validates or refutes the subjective recollections of the individuals involved. Furthermore, the actual audio from the event can make compelling courtroom evidence.

Such use of portable radio communications is hampered by the typically poor quality of the audio signal, and in particular by the audio record's limitation to the radio holder's voice, which, by design, and particularly in emergency situations when the radio holder is speaking loudly and rapidly, dominates the signal and masks other speakers and background sounds at the crime scene.

BRIEF DESCRIPTION OF THE DRAWINGS

Embodiments will now be described by way of example with reference to the accompanying drawings, in which.

DETAILED DESCRIPTION

A communication device and system are described that contains multiple microphones. At least one of the microphones receives acoustic signals from a desired source, such as a user. At least one of the microphones receives background acoustic signals. The acoustic signals from the user are enhanced using the background acoustic signals to reduce background noise. These enhanced signals are transmitted from the communication system or device to an emergency network when an emergency call is made using the communication device. The raw acoustic signals from the microphones are stored in the communication system or device for later retrieval if desired. Alternatively, or in addition to this, the raw acoustic signals from the microphones may be transmitted simultaneously with the enhanced signals to the same location or to different locations within the emergency network system. If the raw acoustic signals are transmitted simultaneously with the enhanced signals, the signals can be transmitted in the same manner as the enhanced signals (e.g., via voice transmission means) or through a different type of transmission (e.g., via data transmission means). The embodiments described herein may be used alone or in combination.

Figure 1:
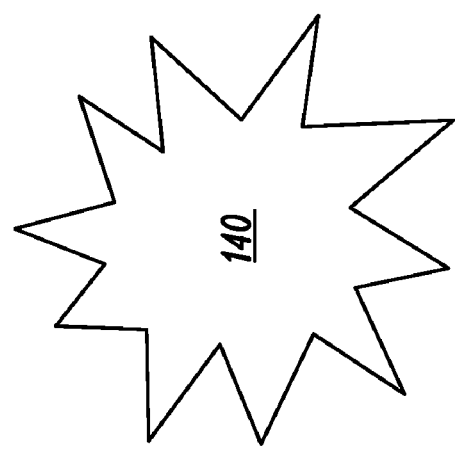
FIG. 1 depicts a typical environment in which a communication device operates.
Figure 1:
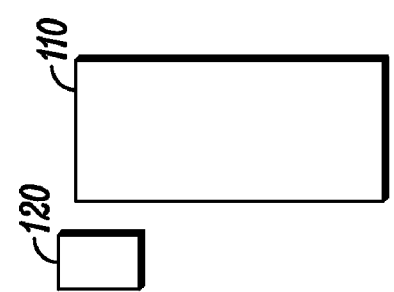
Figure 1:
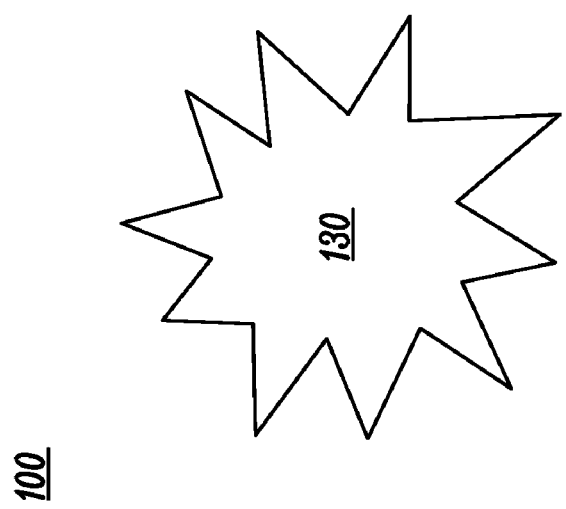

FIG. 1 illustrates a typical environment in which a communication device described below may operate. In the environment 100, a user 110 employs the communication device 120 to speak with one or more remote entities. Noise sources 130, 140 may be present near the user 110. For example, the noise sources may include announcements over a speaker system, music, people, animals, wind, or operating machinery such as vehicle noises or appliances. The communication device 120 can also be part of a communication system that includes a headset or earpiece, for example.

Figure 2B:
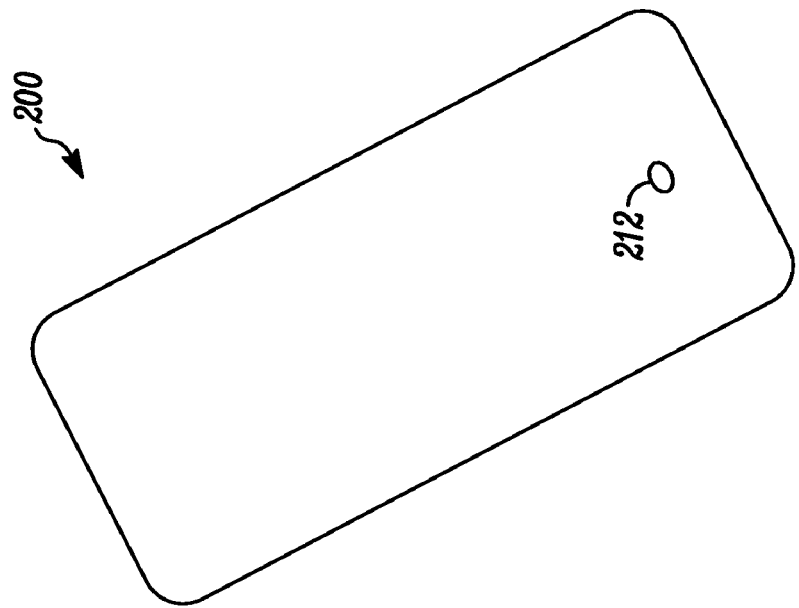
FIG. 2A shows a plan view of the front of a cell phone and FIG. 2B shows a plan view of the back of the cell phone of FIG. 2A.
Figure 2A:
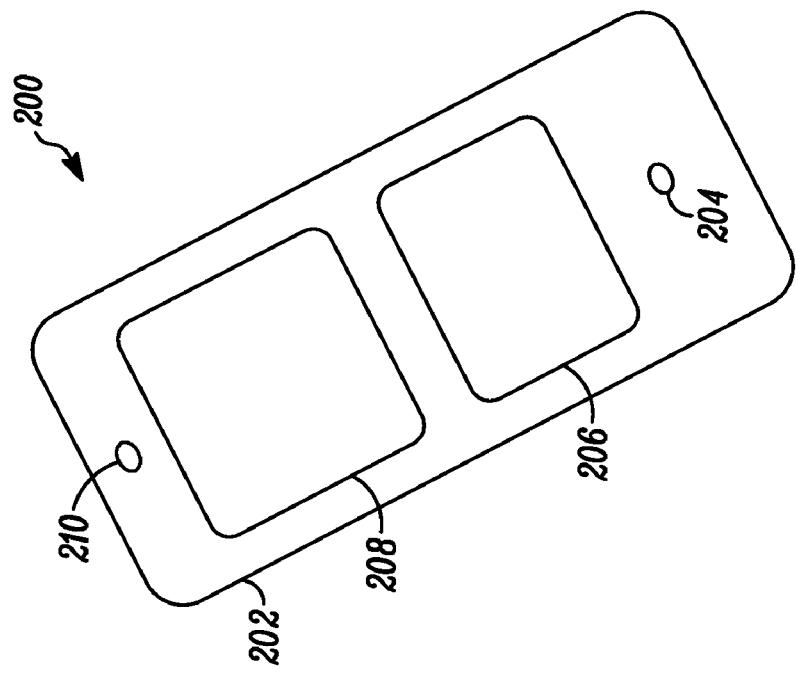

The embodiments described herein may be employed in various types of communication devices such as mobile communication devices, which include ubiquitous cell phones. FIG. 2 is a plan view of a cell phone having multiple microphones in which FIG. 2A illustrates the front face of the cell phone 200 and FIG. 2B illustrates the back face of the cell phone 200. The cell phone 200 includes a case 202 in which a front microphone 204, inputs 206, and a speaker 210 are disposed as desired. The inputs 206 may contain, for example, buttons to enter telephone numbers. These buttons may contain illuminated or non-illuminated alpha-numeric and other characters that permit the entry of telephone numbers or other data into cell phone 200. The cell phone 200 may also contain a display 208. The cell phone contains electronic components, such as a memory and processor, and circuitry to permit the cell phone 200 to operate.

As shown in FIG. 2B, the rear of the cell phone 200 contains a rear microphone 212. The front and rear microphones 204, 212 may be, for example, cardioid microphones, which are designed to receive acoustic signals primarily from a particular direction or omni-directional microphones, which are designed to receive acoustic signals essentially equally well from all directions.

The cell phone may be a bar-type phone, flip-type phone, slide-type phone or any other type of cell phone. In addition, other input devices, such as a camera on the front of the cell phone 200 or additional input buttons on the side of the cell phone 200 may be present.

Figure 3:
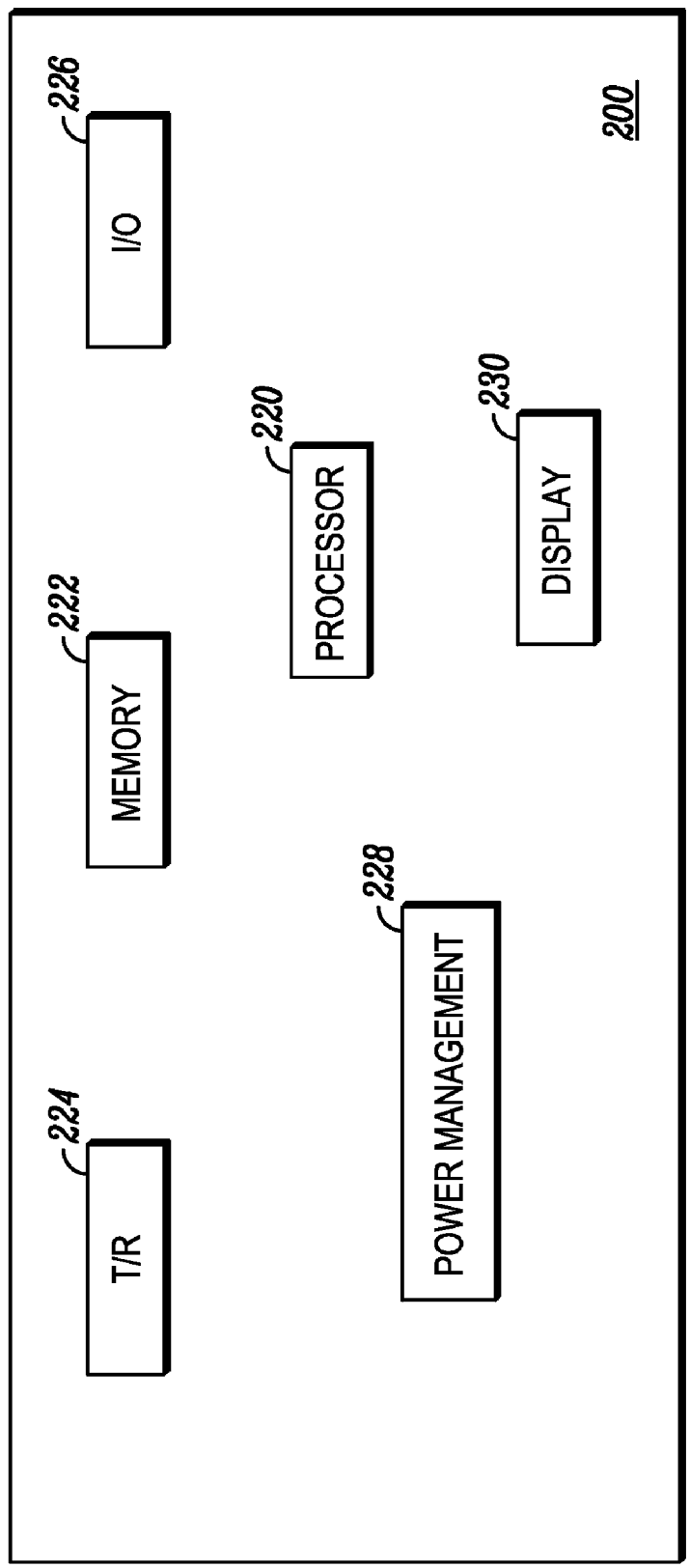
FIG. 3 illustrates circuitry within the cell phone of FIGS. 2A and 2B.

Some of the electronics and circuitry in the cell phone 200 is shown in FIG. 3. This circuitry includes a processor 220, a memory 222, transmit/receive (T/R) circuitry 224, input/output circuitry (I/O) 226, power management circuitry 228, and display circuitry 230. Here, as elsewhere throughout this detailed description, the term "a" may encompass one or more elements. For convenience, other necessary and optional circuitry has not been shown. Similarly, some of the electronics and/or circuitry shown may be combined.

Processing recordings from multiple microphone arrays to improve the audio quality or to isolate particular speakers is known. A first microphone may be used to reduce the background noise, which serves to improve the quality of the primary voice signal received by a second microphone. The processing puts a partial null on the primary speaker to provide a noise estimate for noise-reduction processing. In this case, known techniques such as Blind Source Separation (BSS) and Robust Dual Input Noise Suppressor (RDINS) techniques may be applied to improve the signal to noise ratio (SNR) and subjective quality of the primary voice signal. In the embodiments described herein, such noise-reduction processing may be accomplished in the communication device and the improved primary voice signal transmitted from the communication device to a base station or directly to another communication device.

In one particular example, enhanced quality audio from a communication device containing two microphones can be captured at 8K samples and 16 bits/sample. For the full spectrum of voice audio (approximately 200 Hz-4 KHz), this is equivalent to CD quality. At this rate, about 15 minutes of enhanced quality voice audio can be captured and stored in about 28 MB of memory. Known data reduction algorithms can reduce this, for example, by half with minimal loss of quality. The storage capacity of memory 222 shown in FIG. 3 may be less than 28 MB as most emergency phone calls are relatively short in duration. Alternatively, the storage capacity of memory 222 may be at least 28 MB, for example for emergency service, police, fire, or military personnel whose communication equipment may be used to a greater extent than a typical person. If desired, the storage capacity of memory 222 in a consumer cell phone may be greater than 28 MB as well.

Figure 4:
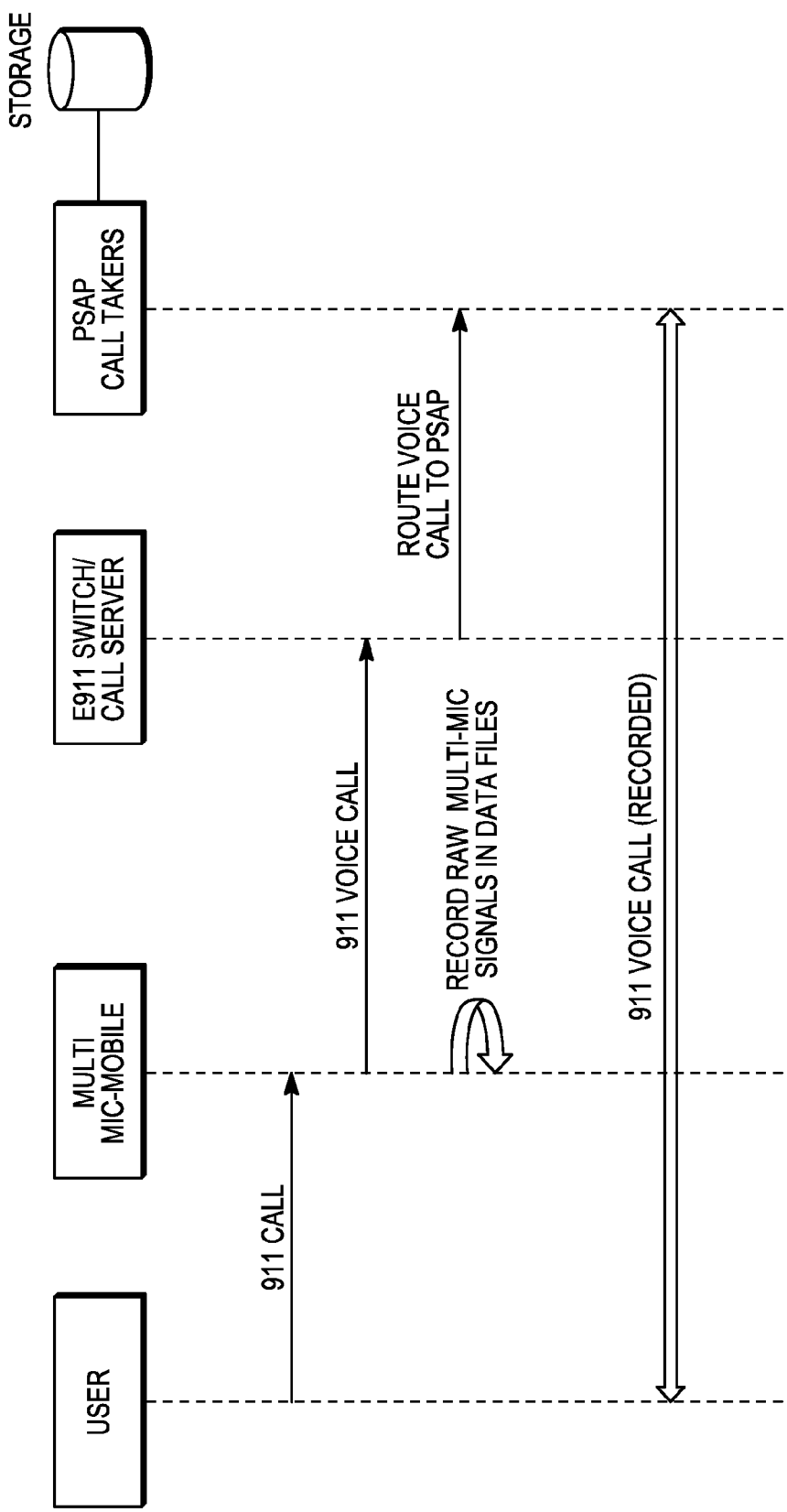
FIG. 4 is a diagram showing one embodiment of signals from a communication device.

In the embodiment shown in FIG. 4, an emergency call (911) is made from a communication device having multiple microphones, e.g., a handset having front and rear microphones. The voice of the user making the call and background noise from other acoustic sources is picked up by the microphones as raw data. The voice of the user is enhanced using the raw data from the microphones. The enhanced voice data is then supplied from the device to an Enhanced 911 (E911) switch or call server. The E911 switch routes the enhanced voice data call to a Public Safety Answering Point (PSAP), where the 911 call is answered by an operator. A storage unit records the conversation between the 911 caller and the operator. The device automatically stores raw acoustic data from the microphones in an internal memory. The raw acoustic data may be stored within the memory in any manner desired. For example, the raw acoustic data may be stored in a queue, which permits the most recent data to be retrieved in the aftermath of an emergency. The raw acoustic data may be retrieved directly from the device or may be transmitted to another device, through a physical or wireless connection, for later retrieval. The raw acoustic data may be stored in the device after the emergency call has terminated until a predetermined criterion is met, e.g., the next 911 call is made from the device (or a set number of 911 calls has occurred), a set amount of time elapses, or it is otherwise more desirable to overwrite the raw data than to retain it. Safety mechanisms may be incorporated in the device to avoid accidental erasure of the memory containing the stored raw data. The enhanced voice data may or may not be stored, as desired.

Figure 5:
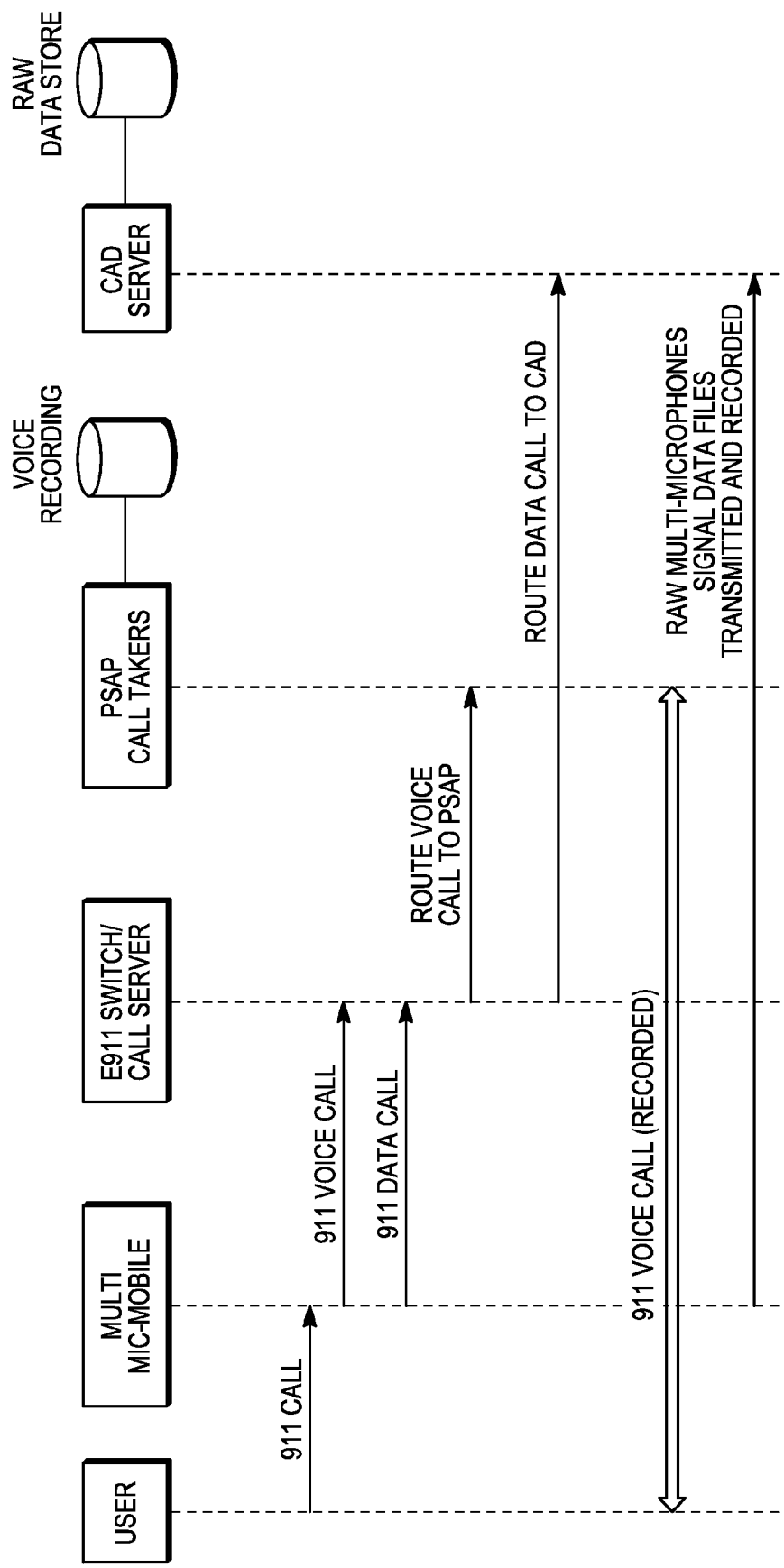
FIG. 5 is a diagram showing another embodiment of signals from a communication device.
Figure 6:
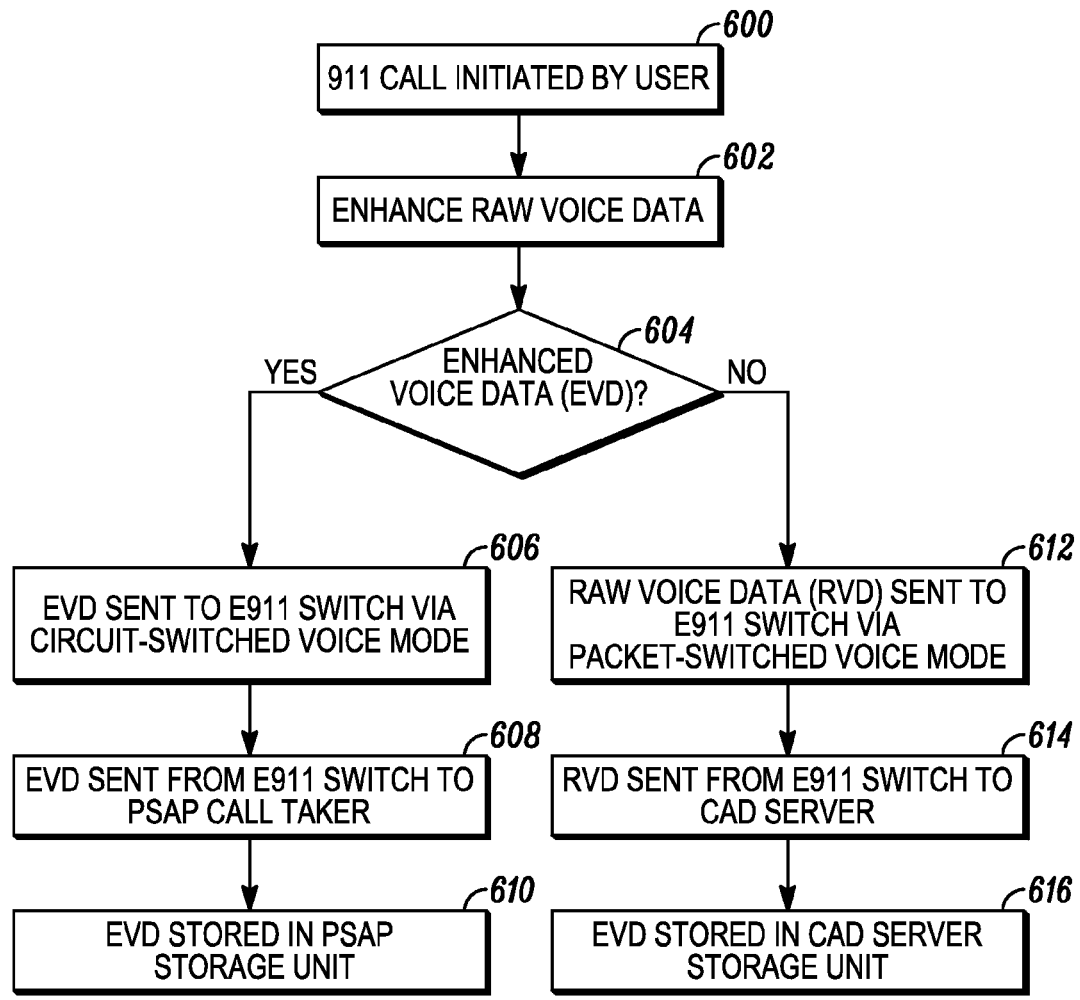
FIG. 6 is a flowchart of the process of FIG. 5.

In another embodiment shown in FIGS. 5 and 6, when a 911 call is made (600) from a communication device having multiple microphones, the voice of the user making the call and background noise is picked up by the microphones as raw data. The voice of the user is enhanced using the raw data from the microphones (602). The enhanced voice data and the raw data are separated (604). The enhanced voice data is transmitted to the E911 switch using a circuit-switched voice mode (606). The E911 switch routes the enhanced voice data call to the PSAP (608), where the 911 call is answered by an operator. A first storage unit stores the conversation between the 911 caller and the operator (610).

As further shown in FIGS. 5 and 6, the raw data is also transmitted simultaneously to the E911 switch (612). However, rather than being transmitted using a circuit-switched voice mode, the raw data is transmitted by the device using a packet-switched data mode. One such device capable of this is a Global System for Mobile communication (GSM) cell phone. Such a mode shift permits the transmission of the raw data to use data services such as General Packet Radio Service (GPRS) or Enhanced Data GSM Environment (EDGE). These data services can provide up to 42 Kbps and 118.4 Kbps rates, respectively, from device to base station, many times higher than that available to the voice channel, allowing for improved audio quality. The enhanced quality full-spectrum audio from two microphones, for example, may use 256 Kbps, but can be reduced (e.g., halved) with minimal loss of quality. The E911 switch routes the raw data to a computer-assisted dispatch (CAD) server (614), where it is stored in a second storage unit (616).

An automatic internal mechanism, such software, or a manual external mechanism, such as a button on the device, may be used to trigger transmission of the raw acoustic data simultaneously with the enhanced voice signal when a 911 call is made from the device. The software could, for example, automatically trigger simultaneous transmission whenever a 911 call is placed or may only trigger when a predetermined criterion is met (such as a preset voice volume level or a predetermined amount of stress in the primary voice, or the utterance of a particular phrase). Alternatively, a button or other manually-activated device could be used to trigger transmission of the raw acoustic data when the user desires. Such embodiments may be useful for emergency responders such as police or fire-fighters or for military personnel for whom relatively normal circumstances, which may or may not be being recorded by one mechanism, can suddenly escalate into emergency situations. If the raw data is being recorded and the manually-activated mechanism is triggered, the raw data can be transmitted from the beginning. The manual mechanism can also be activated after the 911 call has been terminated. The manual mechanism can also be located on another device in communication with the communication device, for example if one microphone is disposed in a handset and another microphone is disposed in a headset or earpiece, the manual mechanism can be disposed in the headset or earpiece rather than or in addition to the communication device. Safety procedures can also be used to prevent accidental storage/transmission of the raw data. For example, storage/transmission could be able to be activated only when the communication device is connected to emergency services.

Using any of the described embodiments permits post-processing of the raw acoustic data to gather more information about the emergency situation for forensic purposes. Post-processing could perform the inverse of the normal function of reducing background speakers and noise. This is to say that, instead of reducing the background noise and enhancing the voice of the primary speaker (e.g., the cell phone user), the voice of the primary speaker is reduced and the background enhanced. This may permit the processing to reveal the words of background voices or the sounds of background events. Such information could be extremely useful to criminal or military investigators. For example, in a battered spouse 911 scenario, what one spouse is saying in the background may be more instrumental in conviction or acquittal than what the other spouse is saying in the foreground.

Such post-processing could be performed by more powerful processors than what is available on the communication device and use more sophisticated processing algorithms than those on the communication device, thereby providing more sophisticated audio processing than what is feasible on the communication device. This may provide better enhancement of the primary speaker signal as well as the background voice signal. Furthermore, as a processed voice record is vulnerable to challenge in court, having the raw acoustic data available may protect against allegations in court of tampering with the raw acoustic data.

Although only one example of microphone placement on a handset is shown, the relative placement of the microphones on the handset may be different. The number of microphones incorporated in the handset may also be different. For example, multiple microphones may be disposed on the front and/or rear of the handset. Alternatively, or in addition, one or more microphones may be disposed on one or more of the sides of the handset. Alternatively, or in addition, one or more microphones may be disposed on auxiliary devices, for example an earphone or headphones wirelessly connected to the handset. Other communication devices, such as communication devices used in conference rooms, may also contain multiple microphones. The microphones in these communication devices may be disposed in various arrangements including in a circular or spherical arrangement.

Although consumer handsets have been described with particularity, the embodiments can be incorporated in other portable or mounted public safety handsets. For example, the multiple microphone system can be used in portable communicators carried by the military or emergency responders such as emergency medical technicians, the police, or the fire department. The multiple microphone system can also be used in a radio mounted on a vehicle.

In the foregoing, embodiments have been described as have benefits and advantages of these embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

The invention claimed is:

1. A communication device comprising:
   first and second microphones respectively configured to receive first raw acoustic data associated with a desired acoustic source and second raw acoustic data associated with background acoustic sources;
   a processor configured to enhance the first raw acoustic data from the first microphone using the second raw acoustic data from the second microphone to produce third enhanced acoustic data;
   a transmitter configured to transmit the third enhanced acoustic data from the device; and
   at least one of:
      a memory configured to store the first and second raw acoustic data from the respective first and second microphones such that each of the first and second raw acoustic data may be retrieved some time after the transmission of the third enhanced acoustic data; and
      a trigger mechanism configured to trigger transmission of the first and second raw acoustic data from the respective first and second microphones simultaneously with the third enhanced acoustic data.

2. The communication device of claim 1, wherein the communication device is a handset in which the first and second microphones are disposed on opposite sides of the handset.

3. The communication device of claim 1,
   wherein the communication device comprises the memory configured to store the first and second raw acoustic data from the respective first and second microphones for retrieval after the transmission of the third enhanced acoustic data; and
   wherein the memory stores the first and second raw acoustic data from the respective first and second microphones only when an emergency call is being made from the device.

4. The communication device of claim 3, wherein the first and second raw acoustic data is stored after the emergency call has terminated and until a predetermined criterion is met.

5. The communication device of claim 1,
   wherein the communication device comprises the trigger mechanism configured to trigger transmission of the first and second raw acoustic data from the respective first and second microphones simultaneously with the third enhanced acoustic data and
   wherein the trigger mechanism is further configured to trigger the transmission of the first and second raw acoustic data simultaneously with the third enhanced acoustic data only when an emergency call is made from the device.

6. The communication device of claim 5, wherein the trigger mechanism is further configured to automatically trigger the transmission of the first and second raw acoustic data simultaneously with the third enhanced acoustic data when the emergency call is initiated.

7. The communication device of claim 5, further comprising an external user input mechanism;
   wherein the trigger mechanism triggers the transmission of the first and second raw acoustic data simultaneously with the third enhanced acoustic data in response to a manipulation of the external user input mechanism.

8. The communication device of claim 5, wherein the device transmits the third enhanced acoustic data in a circuit-switched voice mode and the first and second raw acoustic data simultaneously in a packet-switched data mode.

9. The communication device of claim 4, wherein the predetermined criterion is one of a subsequent different emergency call and a predetermined period of time after the emergency call has been terminated.

10. A method of handling raw acoustic data from multiple microphones on a communication device, the method comprising:
    receiving first raw acoustic data from a first microphone on the device associated with a desired acoustic source and second raw acoustic data from a second microphone on the device associated with, background acoustic sources;
    enhancing the first raw acoustic data from the first microphone using the second raw acoustic data from the second microphone to produce third enhanced acoustic data of the desired acoustic source;
    transmitting the third enhanced acoustic data from the device; and
    at least one of:
       storing the first and second raw acoustic data from the respective first and second microphones in the device such that each of the first and second raw acoustic data may be retrieved some time after transmitting the third enhanced acoustic data; and
       transmitting the first and second raw acoustic data from the respective first and second microphones simultaneously with the third enhanced acoustic data.

11. The method of claim 10, wherein the communication device is a handset in which the first and second microphones are disposed on opposite sides of the handset.

12. The method of claim 10, wherein the method comprises storing the first and second raw acoustic data from the respective first and second microphones in the device for retrieval after transmitting the third enhanced acoustic data;

the method further comprising initiating the storing of the first and second raw acoustic data from the respective first and second microphones only when an emergency call is made from the communication device.

13. The method of claim 12, further comprising maintaining storage of the first and second raw acoustic data after the emergency call has terminated and until a predetermined criterion is met.

14. The method of claim 10, wherein the method comprises transmitting the first and second raw acoustic data from the respective first and second microphones simultaneously with the third enhanced acoustic data;
the method further comprising triggering the transmitting of the first and second raw acoustic data from the respective first and second microphones simultaneously with the third enhanced acoustic data only when an emergency call is made from the device.

15. The method of claim 14, further comprising automatically triggering the transmitting of the first and second raw acoustic data from the respective first and second microphones simultaneously with the third enhanced acoustic data when the emergency call is initiated.

16. The method of claim 14, further comprising triggering the transmitting of the first and second raw acoustic data from the respective first and second microphones simultaneously with the third enhanced acoustic data in response to a detected manipulation of an external user input mechanism of the communication device.

17. The method of claim 14, further comprising transmitting the third enhanced acoustic data in a circuit-switched voice mode and the first and second raw acoustic data simultaneously in a packet-switched data mode.

18. The method of claim 13, wherein the predetermined criterion is one of a subsequent different emergency call and a predetermined period of time after the emergency call has been terminated.

19. A communication system comprising:
a first microphone disposed on a first communication device of the communication system and configured to receive first raw acoustic data from a desired acoustic source and from background acoustic sources;
a second microphone disposed on a second communication device of the communication system and configured to (i) receive second raw acoustic data from the desired acoustic source and from the background acoustic sources and (ii) transmit the second raw acoustic data to the first communication device;
a processor in the first communication device configured to enhance the first and second raw acoustic data from the respective first and second microphones to produce third enhanced acoustic data associated with the desired acoustic source;
a transmitter configured to transmit the third enhanced acoustic data; and
at least one of:
a memory configured to store the first and second raw acoustic data from the respective first and second microphones such that each of the first and second raw acoustic data may be retrieved some time after the transmission of the third enhanced acoustic data; and
a trigger mechanism configured to trigger transmission of the first and second raw acoustic data from the respective first and second microphones simultaneously with the third enhanced acoustic data.

20. The system of claim 19, wherein the system comprises the trigger mechanism configured to trigger transmission of the first and second raw acoustic data from the respective first and second microphones simultaneously with the third enhanced acoustic data; and
wherein the trigger mechanism is further configured to trigger the transmission of the first and second raw acoustic data from the respective first and second microphones simultaneously with the third enhanced acoustic data only when an emergency call is being made from the communication system.

* * * * *

UNITED STATES PATENT AND TRADEMARK OFFICE
CERTIFICATE OF CORRECTION

| | | |
|---|---|---|
| PATENT NO. | : 8,036,716 B2 | Page 1 of 1 |
| APPLICATION NO. | : 12/025182 | |
| DATED | : October 11, 2011 | |
| INVENTOR(S) | : Dunn et al. | |

It is certified that error appears in the above-identified patent and that said Letters Patent is hereby corrected as shown below:

Title Page, Item (57), under "ABSTRACT", in Column 2, Line 5, delete "signal" and insert -- signals --, therefor.

In Column 6, Line 13, in Claim 5, delete "data" and insert -- data; --, therefor.

In Column 6, Line 44, in Claim 10, delete "with," and insert -- with --, therefor.

Signed and Sealed this
Eighteenth Day of December, 2012

David J. Kappos
*Director of the United States Patent and Trademark Office*